(12) United States Patent
Yasutomi

(10) Patent No.: US 10,972,679 B2
(45) Date of Patent: Apr. 6, 2021

(54) IMAGE PROCESSING APPARATUS AND METHOD FOR CONTROLLING IMAGE PROCESSING APPARATUS

(71) Applicant: CANON KABUSHIKI KAISHA, Tokyo (JP)

(72) Inventor: Takeshi Yasutomi, Hino (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/706,074

(22) Filed: Dec. 6, 2019

(65) Prior Publication Data
US 2020/0120286 A1 Apr. 16, 2020

Related U.S. Application Data

(63) Continuation of application No. 14/616,538, filed on Feb. 6, 2015, now Pat. No. 10,531,013.

(30) Foreign Application Priority Data

Feb. 10, 2014 (JP) .................................. 2014-023825
Sep. 12, 2014 (JP) .................................. 2014-186869

(51) Int. Cl.
| | |
|---|---|
| *H04N 5/243* | (2006.01) |
| *H04N 5/353* | (2011.01) |
| *H04N 5/232* | (2006.01) |
| *H04N 5/262* | (2006.01) |
| *H04N 1/21* | (2006.01) |
| *G09G 5/377* | (2006.01) |
| *G09G 5/393* | (2006.01) |

(52) U.S. Cl.
CPC ............ *H04N 5/243* (2013.01); *G09G 5/377* (2013.01); *G09G 5/393* (2013.01); *H04N 1/215* (2013.01); *H04N 1/2125* (2013.01); *H04N 1/2133* (2013.01); *H04N 1/2145* (2013.01); *H04N 5/23229* (2013.01); *H04N 5/2621* (2013.01); *H04N 5/2625* (2013.01); *G09G 2320/0257* (2013.01); *G09G 2340/10* (2013.01)

(58) Field of Classification Search
CPC . H04N 5/353–3537; H04N 5/235–243; G03B 7/00–28; G03B 2207/00–005
USPC ............ 348/362–368, 222.1, 229.1, 208.12; 396/213–262
See application file for complete search history.

(56) References Cited

U.S. PATENT DOCUMENTS

| | | | |
|---|---|---|---|
| 6,856,427 B1* | 2/2005 | Gilman | H04N 1/6011 358/1.9 |
| 10,186,066 B2* | 1/2019 | Zou | H04N 5/2625 |
| 2016/0080660 A1* | 3/2016 | Yamamoto | H04N 1/2141 348/239 |
| 2016/0182841 A1* | 6/2016 | Iwasaki | H04N 5/23293 348/362 |

\* cited by examiner

*Primary Examiner* — Xi Wang
(74) *Attorney, Agent, or Firm* — Canon U.S.A., Inc. I.P. Division

(57) ABSTRACT

In an image processing apparatus that performs interval moving image capturing, interval image capturing and lighten compositing are sequentially performed, whereby an effective interval moving image can be obtained without advance techniques and cumbersome procedure that have been required for providing special effects to moving images.

10 Claims, 11 Drawing Sheets

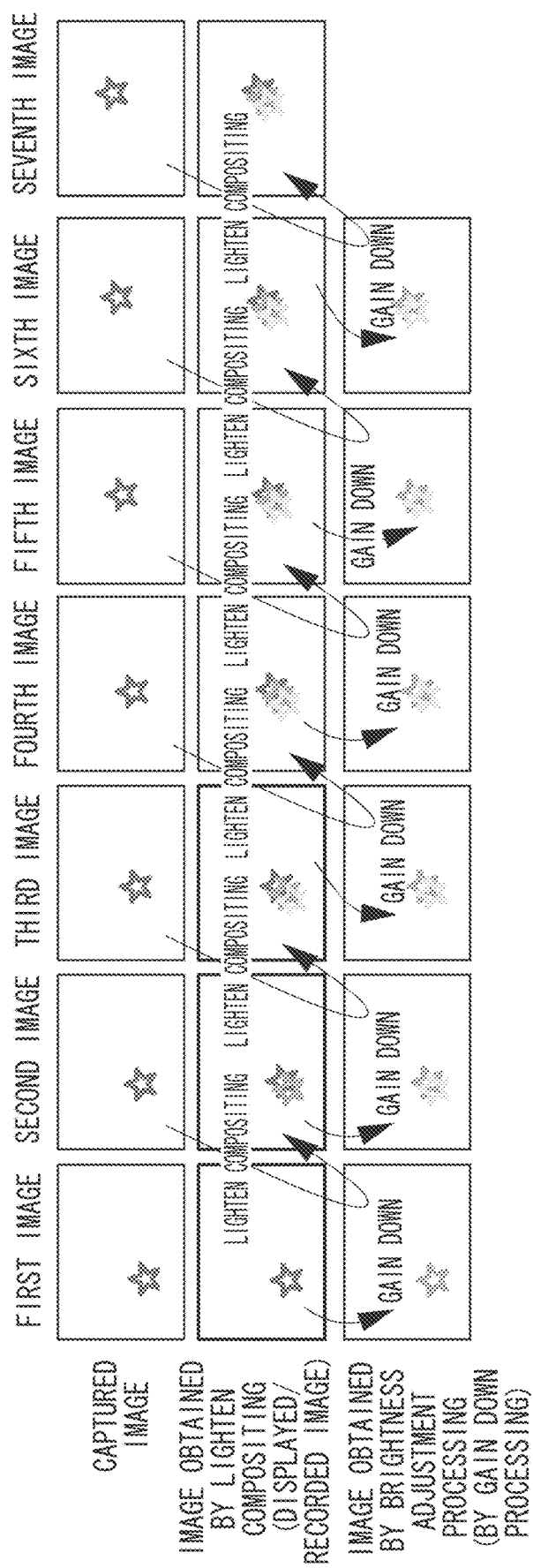

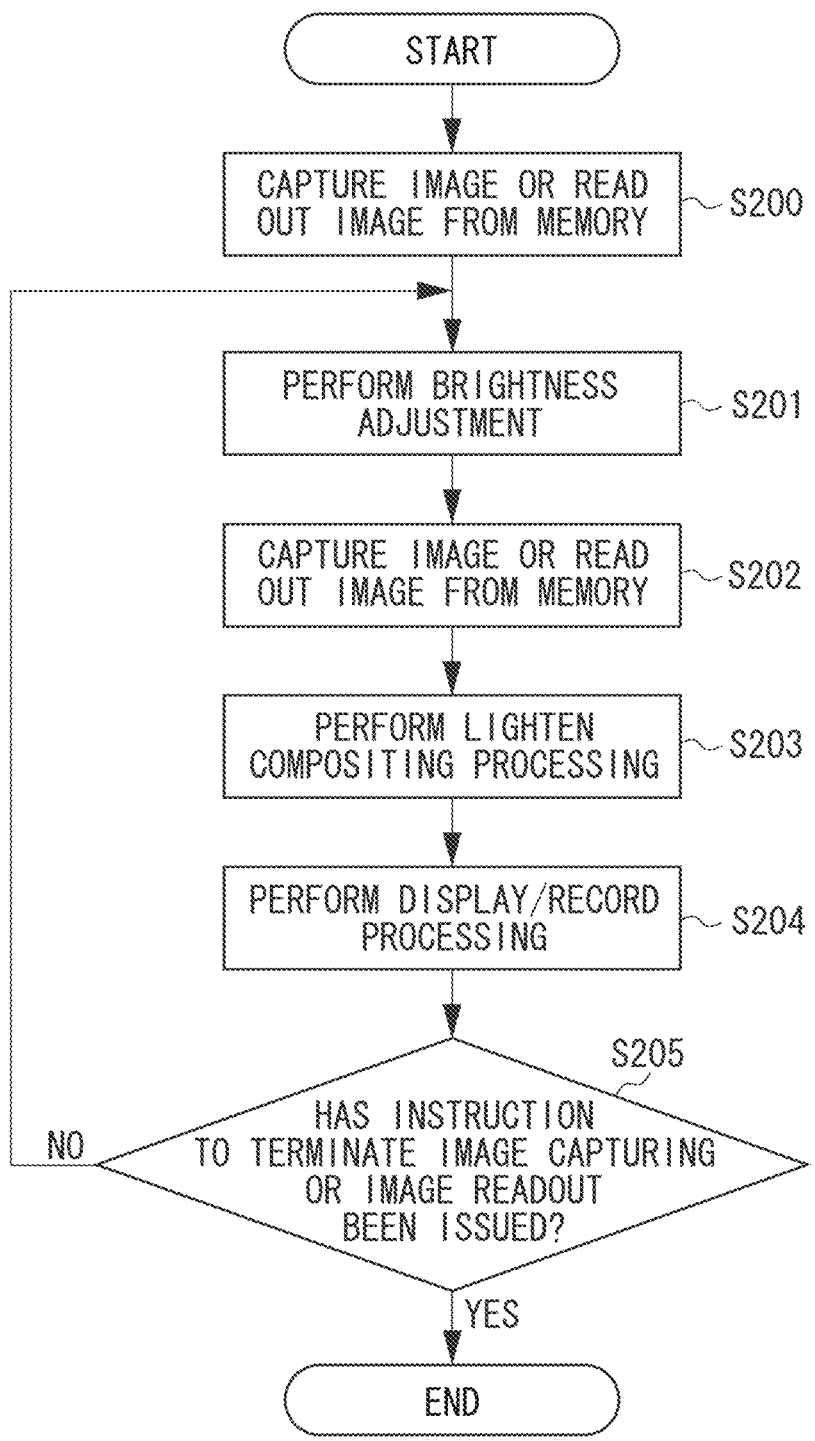

FIG. 7

| CAPTURED IMAGE (FRAME NUMBER) / BRIGHTNESS AFTER GAIN DOWN PROCESSING [%] | 1 | 2 | 3 | 4 |
|---|---|---|---|---|
| FIRST FRAME | 30 | | | |
| SECOND FRAME | 60 | 30 | | |
| THIRD FRAME | 100 | 60 | 30 | |
| FOURTH FRAME | – | 100 | 60 | 30 |

FIG. 8

| CAPTURED IMAGE (FRAME NUMBER) / BRIGHTNESS AFTER GAIN DOWN PROCESSING [%] | 1 | 2 | 3 | 4 |
|---|---|---|---|---|
| FIRST FRAME | 100 | | | |
| SECOND FRAME | 100 | 30 | | |
| THIRD FRAME | 100 | 60 | 30 | |
| FOURTH FRAME | — | 100 | 60 | 30 |

IMAGE PROCESSING APPARATUS AND METHOD FOR CONTROLLING IMAGE PROCESSING APPARATUS

CROSS-REFERENCE TO RELATED APPLICATIONS

This application is a Continuation, and claims the benefit, of U.S. patent application Ser. No. 14/616,538, presently pending and filed on Feb. 6, 2015, and claims the benefit of, and priority to, Japanese Patent Application No. 2014-023825, filed Feb. 10, 2014, and Japanese Patent Application No. 2014-186869, filed Sep. 12, 2014, which applications are hereby incorporated by reference herein in their entireties.

BACKGROUND OF THE INVENTION

Field of the Invention

The present invention relates to an image processing apparatus, and more particularly relates to an image processing apparatus that performs lighten composite processing by using a plurality of captured images in interval moving image capturing processing.

Description of the Related Art

Recently, with the advancement of digital camera technology and the wide spread of the digital cameras, the digital cameras have been used for various imaging purposes to give sprout to new visual expression methods, unachievable back in the days when film cameras were dominant, including the following. One of the examples includes a new type of image is generated using a number of still images captured through interval imaging by a digital camera fixed to a tripod. In this context, Japanese Patent Application Laid-Open No. 2013-62740 discusses compositing processing known as lighten compositing. The lighten compositing is used for obtaining a photograph of fireflies in the imaging screen with increased light trails, and a photograph of light trails of stars moving across a night sky along with diurnal motion of the earth, as well as a moving image as a series of such images.

The lighten compositing is generally implemented with dedicated software installed in a personal computer (PC) and the like. More specifically, lighten compositing is generally implemented, using the software, on a large number of images captured through the interval imaging using the digital camera and imported to the PC, by a photographer.

However, in this method, it is necessary for the photographer to import a large number of images captured through the interval imaging using the digital camera. Therefore, the photographer has to know not only how to use the digital camera but also how to use the PC and the software, because the photographer has to copy the large number of captured images to the PC, for example. If the photographers intend to perform advanced image processing, the challenge level is high and therefore it is difficult to perform.

SUMMARY OF THE INVENTION

The present invention is directed to an image processing apparatus and a method for controlling the image processing apparatus capable of generating a moving image expressing an afterimage from a plurality of sequentially captured images, through a simple operation.

According to an aspect of the present invention, an image processing apparatus includes an acquisition unit configured to sequentially acquire pieces of image data, a combining unit configured to perform lighten compositing of selecting data with a larger value in a corresponding area between the pieces of image data to generate composite image data, an adjustment unit configured to perform adjustment processing to lower brightness on the composite image data output from the combining unit, and a generation unit configured to generate moving image data including frames each being the composite image data output from the combining unit, wherein the combining unit is configured to output new composite image data generated by performing the lighten compositing on the pieces of image data sequentially acquired by the acquisition unit and the composite image data subjected to the adjustment processing output from the adjustment unit.

According to another aspect of the present invention, an image processing apparatus includes an acquisition unit configured to sequentially acquire pieces of image data, a combining unit configured to perform lighten compositing of selecting data with a larger value in a corresponding area between the pieces of image data to generate composite image data, an adjustment unit configured to perform adjustment processing to lower brightness on the composite image data output from the combining unit and to output the resultant composite image data to the combining unit, and a generation unit configured to generate moving image data by using pieces of image data obtained by sequentially performing the lighten compositing by the combining unit, and the adjustment processing by the brightness adjustment unit, on the pieces of image data sequentially acquired by the acquisition unit.

According to yet another aspect of the present invention, an image processing apparatus includes an acquisition unit configured to sequentially acquire pieces of image data, a combining unit configured to perform lighten compositing of selecting data with a larger value in a corresponding area between the pieces of image data to generate composite image data, an adjustment unit configured to perform adjustment processing to lower brightness on the composite image data output from the combining unit, and a generation unit configured to generate moving image data including frames each being the composite image data output from the combining unit, wherein the generation unit has a mode of generating the moving image data including frames obtained by repeatedly using the combining unit and the brightness adjustment unit for the pieces of image data sequentially acquired by the acquisition unit, and a mode of generating moving image data including frames obtained by repeatedly using the combining unit without the adjustment processing by the brightness adjustment unit.

Further features of the present invention will become apparent from the following description of exemplary embodiments with reference to the attached drawings.

BRIEF DESCRIPTION OF THE DRAWINGS

FIGS. 2A and 2B are diagrams illustrating a procedure of processing for obtaining an afterimage effect according to a first exemplary embodiment.

FIG. 7 is a diagram illustrating brightness adjustment to generate a first half portion of the star trail according to the second exemplary embodiment of the present invention.

FIG. 8 is a diagram illustrating a modified example of brightness adjustment to generate a second half portion of the star trail according to the second exemplary embodiment of the present invention.

DESCRIPTION OF THE EMBODIMENTS

Hereinbelow, exemplary embodiments of the present invention are described with reference to the drawings.

Figure 1:
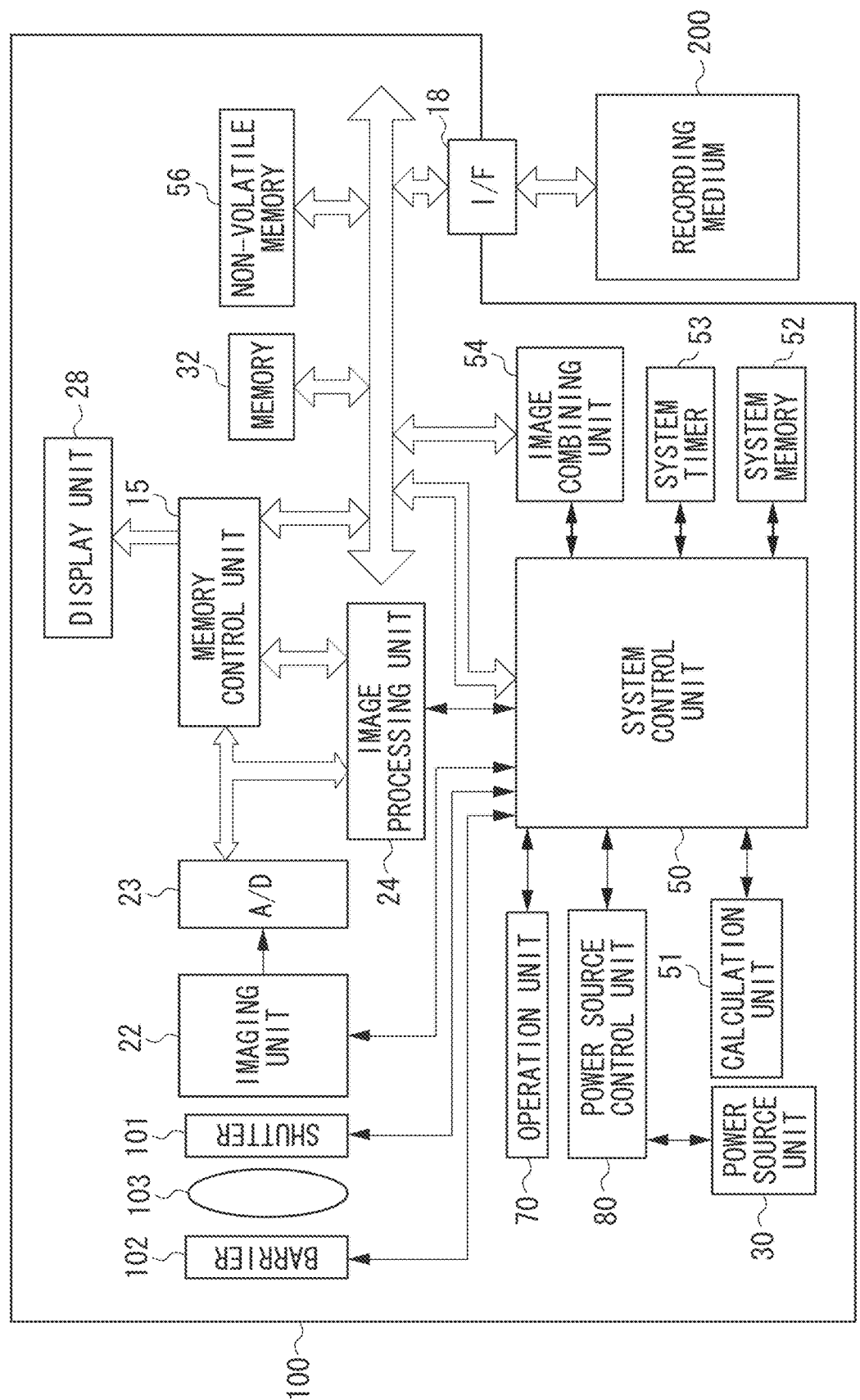
FIG. 1 is a block diagram illustrating a configuration of an image processing apparatus according to an exemplary embodiment of the present invention.

FIG. 1 is a block diagram illustrating a configuration of an image processing apparatus according to an exemplary embodiment of the present invention.

An image processing apparatus 100 in FIG. 1 is, for example, a digital camera.

The image processing apparatus 100 includes an imaging lens 103, a mechanical shutter 101 having an aperture function, an imaging unit 22 having an image sensor for converting an optical image into an electrical signal, and an analog-digital (A/D) converter 23 that converts an analog signal output from the imaging unit 22 into a digital signal. The image sensor of the imaging unit 22 has, but is not limited to, a configuration in which R, G, and B pixels are regularly arranged in the Bayer arrangement. The imaging unit 22, the imaging lens 103, and the shutter 101 are controlled by a system control unit 50 using a timing generation circuit.

The shutter 101 is not limited to the mechanical shutter, and may be an electrical shutter, with which storage time can be controlled through controlling a reset timing of the image sensor. With this configuration, the digital camera can used to capture an image such as a moving image.

An image processing unit 24 performs processing on data from the A/D converter 23 or a memory control unit 15. The processing includes various types of correction processing such as pixel interpolation processing and shading correction, as well as white balance (WB) processing, γ correction processing, and color conversion processing. The image processing unit 24 can perform image cut-out and zooming processing to implement an electric zoom function. The shading correction processing is processing performed on data from the A/D converter 23 or the memory control unit 15, to correct brightness level in the image area so as to reduce shading. The shading is attributable to characteristics of the imaging lens 103 and characteristics of the imaging unit 22 such as aberration. The WB processing is performed on image data subjected to the shading correction processing, to set white as the white reference in the image area. In the shading processing of the present exemplary embodiment, a gain is applied to each pixel in accordance with the two-dimensional coordinates (position) of the pixel in the image sensor of the imaging unit 22. In the WB processing of the present exemplary embodiment, different gains are applied to R, G1, G2, and B signals in the Bayer arrangement. An image combining unit 54 includes a compositing processing circuit that combines a plurality of pieces of image data. In the present exemplary embodiment, not only simple addition combining or addition average combining but also lighten or darken composite processing can be performed. In the lighten or darken composite processing, a single image data piece is generated by selecting images with the brightest or the darkest values in areas of pieces of image data to be combined. The image combining unit 54 may be integrally formed with the image processing unit 24.

In the image processing unit 24, predetermined calculation processing is performed using the captured image data, and the system control unit 50 performs auto focus (AF) processing, auto exposure (AE) processing, and electronic flash (EF) processing of a through the lens (TTL) system.

The memory control unit 15 controls the A/D converter 23, the image processing unit 24, and a memory 32.

Data from the A/D converter 23 is written into the memory 32 through the memory control unit 15 with or without being processed by the image processing unit 24.

A display unit 28, which is formed of a thin film transistor (TFT) liquid crystal display (LCD), displays through the memory control unit 15 the data to be displayed, which has been written to the memory 32.

Live view display and an electronic finder function can be implemented using the display unit 28. More specifically, sequentially captured pieces of image data are sequentially acquired by repeating exposure and readout at a predetermined cycle by the imaging unit 22. Then, the acquired pieces of image data are sequentially displayed on the display unit 28 through the image processing unit 24, the memory control unit 15, and the like.

The display unit 28 can turn ON and OFF the display as desired through an instruction from the system control unit 50. The digital camera 100 can operate with much lower power consumption by turning OFF the display.

The memory 32 stores captured still and moving images, and has a storage capacity large enough to store the still images in a predetermined number and the moving image for a predetermined period of time.

Thus, a large amount of images can be rapidly written to the memory 32 to achieve panoramic imaging and continuous imaging of a plurality of captured still images.

The memory 32 can also be used as a work area for the system control unit 50.

The system control unit 50 controls the digital camera 100 as a whole, and executes the above-described program stored in a non-volatile memory 56 to implement each processing of the present exemplary embodiment described below. The program read out from the non-volatile memory 56 and a constant and a variable for operating the system control unit 50, are loaded onto a system memory 52 formed of a random access memory (RAM). The system control unit 50 further controls the memory 32, the display unit 28, and the like to perform display control.

A system timer 53 is a timer unit for measuring time used for various controls and time of an internal clock.

Program codes are written in the non-volatile memory 56, formed of a Flash read only memory (ROM), and are sequentially read therefrom, and executed by the system control unit 50. The non-volatile memory 56 includes an area for storing system information and an area for storing user setting information. Thus, various information pieces and settings can be read to be restored next time when the apparatus is started.

An operation unit 70 includes a touch panel and various buttons such as shutter switches (SW1 and SW2), a menu button, a set button, a macro button, a flash setting button, a single imaging/continuous imaging/self-timer switching button, a menu move + (plus) button, a menu move –

(minus) button, a captured image quality selection button, an exposure compensation button, and a date/time setting button.

An instruction to start an operation such as AF processing, AE processing, and auto white balance (AWB) processing is issued by operating the operation unit 70. More specifically, the operation is triggered by the shutter switch SW1, which is turned on in the middle of the shutter button operation.

An instruction to start a series of operations including exposure processing, development processing, compression/decompression processing, and recording processing is also issued by operating the operation unit 70. More specifically, the operations are triggered by the shutter switch SW2, which is turned on when the operation of the shutter button is completed.

A power source unit 30 is formed of a primary battery such as an alkaline battery or a lithium battery, a secondary battery such as a NiCd battery, a NiMH battery, and a Li battery, an alternating current (AC) adaptor, or the like. The power source unit 30 is controlled by a power source control unit 80.

An interface 18 for a recording medium such as a memory card, a hard disk, and the like includes a connector for connecting to the memory card, the hard disk, and the like.

A barrier 102 covers the imaging lens 103 and the imaging unit 22 of the digital camera 100, to prevent the imaging lens 103 and the imaging unit 22 from being dirty or damaged.

The composite processing for combining a plurality of pieces of image data is described. The image combining unit 54 can perform four types of composite processing including addition combining processing, addition average combining processing, lighten composite processing, and darken composite processing. Here, each pixel value of image data before combining is defined as I_i(x, y) (where i=1 to N, and x, y represents coordinates in the image area). A pixel value of an image obtained by combining the N images is defined as I(x, y). The pixel value may be a value of each of R, G1, G2, and B signals in the Bayer arrangement output from the image processing unit 24. The pixel value may also be a value (brightness value) of a brightness signal obtained from a group of R, G1, G2, and B signals. The brightness value may be calculated for each pixel having R, G, and B signals as a result of interpolation processing performed on signals in the Bayer arrangement in advance. For example, the following formula, featuring weighted adding of the R, G, and B signals, can be used for calculating the brightness value:

$$Y=0.3 \times R+0.59 \times G+0.11 \times B,$$

where Y represents the brightness value. Each processing described above is performed on pixel values associated by performing processing such as position matching among a plurality of data pieces as required. More specifically, the addition combining processing is represented as:

$$I(x,y)=I\_1(x,y)+I\_2(x,y)+ \ldots +I\_N(x,y),$$

where composite image data is obtained by performing adding processing of the pixel values of N images for each pixel. The addition combining processing is represented as:

$$I(x,y)=(a_1 \times I\_1(x,y)+a_2 \times I\_2(s,y)+ \ldots +a_N \times I\_N(x,y))/N,$$

where $a_k$ represents a weighting coefficient, and composite image data is obtained by performing weighted adding processing of the pixel values on the N images for each pixel. The lighten composite processing is represented as:

$$I(x,y)=\max(I\_1(x,y),I\_2(x,y), \ldots ,I\_N(x,y)),$$

where composite image data is obtained by selecting maximum pixel values of N images for each pixel. The darken composite processing is represented as:

$$I(x,y)=\min(I\_1(x,y),I\_2(x,y), \ldots ,I\_N(x,y))$$

where composite image data is obtained by selecting minimum pixel values of N images for each pixel.

The lighten composite processing in the present exemplary embodiment is performed through the following procedure. First of all, interval imaging is started by an instruction from a user. Then, the first one of a plurality of captured images, as the processing target, is set as an initial value in a combining memory area in the memory 32. The second image and the first image set in the combining memory area are compared with each other in the brightness of the corresponding pixel, and the brighter pixel is written back to the combining memory area. The processing is performed on all the pixels, and the composite image obtained from the first and the second images is stored in the combining memory area. Then, the processing described above is repeated for the third image and after. More specifically, the image to be processed is compared with the composite image in the combining memory area in the brightness of the corresponding pixel, so that the brighter (not darker) pixel is written back to the combining memory area, and the processing is performed on all the pixels.

Thus, the processing described above is represented as follows based on the definition above:

$$I2(x, y) = \max(I\_1(x, y), I\_2(x, y)),$$
$$I3(x, y) = \max(I2(x, y), I\_3(x, y)),$$
$$\ldots$$
$$I(x, y) = IN(x, y) = \max(IN-1(x, y), I\_N(x, y)).$$

In the present exemplary embodiment, an interval moving image is generated by using images subjected to the lighten compositing. First of all, an interval moving image capturing is started by an instruction from a user. Through the processing described above, the lighten composite processing is sequentially performed on the captured images starting from the first image that has been captured, and the moving image is sequentially generated with the resultant image as the first image in the interval moving image. The resultant interval moving image thus captured is described with a starry sky as an example. The movement of the stars, each first depicted as a dot, is recorded as the interval moving image, to gradually form trails. All things considered, the interval moving image obtained by lighten compositing can express the movement of the stars in a form of trails. In the present exemplary embodiment, a mode of obtaining a moving image including moving image frames each obtained by the lighten compositing processing on a captured image is referred to as a starry sky trail mode.

However, in this method (mode, when the interval moving image is captured for a long period of time in an environment where so many stars can be observed, a large number of star trails are recorded in the image area, and thus stars might gradually increase to fill the interval moving image in the end. As a result, the movement of stars is difficult to see. Therefore, in the present exemplary embodiment, a starry sky trail afterimage mode is further provided. In this mode, the composite processing is performed in such a manner that brightness of a star is lowered as the frames on a moving image increase, to achieve a visual effect as if the start trails are moving. With this method, the stars are prevented from being lost in a large number of trails, whereby how constellations move can be more easily checked on the moving image. Thus, by using the interval moving image, an expression beyond human's natural ability to see things can be achieved.

In the imaging of stars, the same processing might yield different lengths of obtained trails depending on an environment, because the brightness of a captured star image is affected by the ambient brightness, whether, and the like. Thus, in the present exemplary embodiment, the lighten composite processing is changed in accordance with a user setting, an imaging condition, an imaging environment, and the like. More specifically, the lighten composite processing is controlled in accordance with the setting on the length of the star trails and a brightness of an image (environment) including a By value. In the present exemplary embodiment, the length of the star trail can be set to be one of four stages of 1 (short) to 4 (long), by user setting performed by the operation unit 70 or determination based on the By value. A first composite method is used for the setting 1 or 2, whereas a second composite method is used for the setting 3 or 4.

Figure 3A:
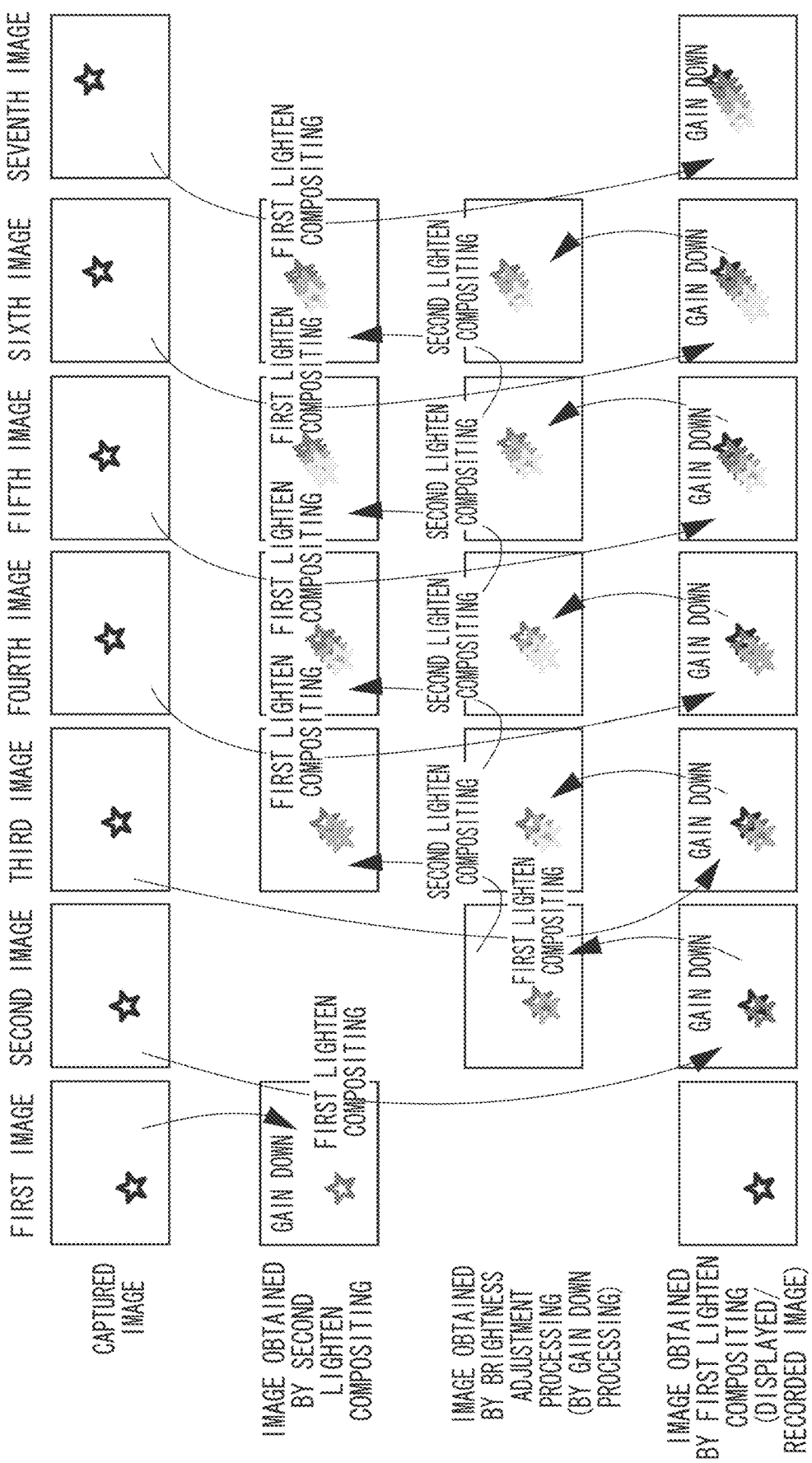
FIGS. 3A and 3B are diagrams illustrating a procedure of processing for obtaining a longer afterimage effect according to the first exemplary embodiment.
Figure 3B:
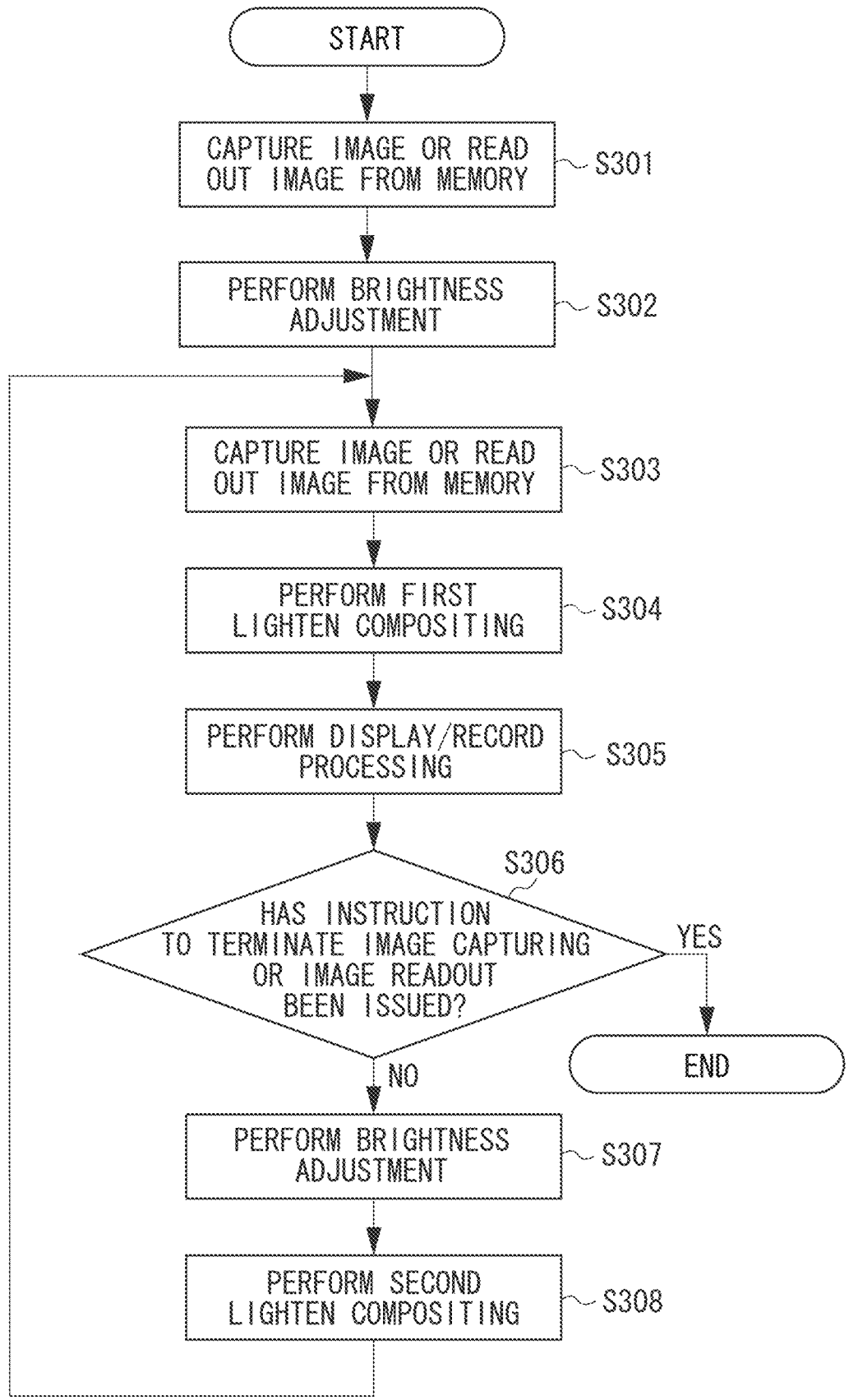

A method for generating a lighten composite moving image according to the present exemplary embodiment is described with reference to FIGS. 2A, 2A, 3A, and 3B. FIG. 2A is an image diagram illustrating composite processing performed when the star trails are set to be relatively short (the setting 1 or 2 described above). FIG. 2B is a flowchart illustrating the composite processing. In FIG. 2A, captured images of the first captured image to the seventh captured image are arranged in this order from the left to the right. Operations illustrated in the flowcharts in FIGS. 2B and 3B may be performed by the system control unit 50 at the time of imaging, or may be performed by reading image data for generating moving image from the memory 32 at the timing other than the imaging. The processing in the flowchart in FIG. 2B starts when the lighten composite processing mode is selected through the user setting on the operation unit 70 with the length of the star trail set to be relatively short (starry sky trail afterimage mode). The operations in the steps in the processing are performed by the system control unit 50 or each unit under an instruction from the system control unit 50.

In step S200, an operation of capturing the first image or reading out the first image from the memory 32 is performed. The image serves as the first frame in the interval moving image, and the system control unit 50 outputs the image to a circuit for performing displaying or recording in a later step. Then, in step S201, gain down processing is performed on the first image or (N−1)th composite image (N≥3) generated in steps S201 to S204, with an adjustment parameter (gain) corresponding to the setting on the length of the trail. The gain applied to the image data is set in such a manner that a gain down level is lower (closer to 1) in the setting 2 in which the trail set to be longer, than in the setting 1. The processing for adjusting the brightness of the image data is not limited to the gain down processing according to the present exemplary embodiment where the gain is applied to each pixel in the image data to lower the brightness, and may be any adjustment processing in which the brightness is adjusted with a digital signal such as γ processing.

In step S202, an operation of capturing the Nth image data (N≥2) or reading out the Nth image data from the memory 32 is performed. Unlike in the case of the first image data, this image data is not directly used as the image in the interval moving image. When the Nth image is captured, in step S203, the lighten compositing is performed on the captured Nth image data and the (N−1)th image after the gain down processing that has been generated in step S201. Thus, the stars captured in the Nth image are combined with the (N−1)th image after the gain down processing. The resultant data is defined as an Nth frame (image data) in the interval moving image. When the moving image data is displayed or recorded each time the image data is captured or read out, in step 204, the display unit 28 displays the Nth composite image on a display medium or the recording unit (system control unit 50) records the composite image in a recording medium 200.

In step S205, it is determined whether an instruction to terminate the image capturing or the image reading has been issued. When the instruction has been issued (YES in step S205), the processing is terminated. When the instruction has not been issued (NO in step S205), the processing returns to step S201, and the captured image acquiring operation, the lighten composite processing, and the brightness adjustment processing (gain down processing) are sequentially performed again. The instruction to terminate the image capturing or the image reading may be issued based on setting information defining the number of images to be captured and the imaging time in advance, or may be issued by an operation of the user. In the (N−1)th composite image in step S201, the starts that have been captured in the first image have been subjected to the gain down processing for total of (N−1) times. Thus, the processing can achieve an expression of gradually darkening the stars. The amount of darkening depends on the gain down amount in each processing. By thus repeating the lighten composite processing and the gain down processing, the interval moving image in which the star trails move like falling star can be generated.

In the method described above, stars that are dark in the first place are quickly darkened by the gain down processing, and the falling star visual effect becomes low. To address this, in the present exemplary embodiment, lighten composite processing illustrated in FIG. 3 (starry sky afterimage mode) is performed when the star trails are set to be relatively long (the settings 3 and 4). In FIG. 3A, captured images of the first captured image to the seventh captured image are arranged in this order from the left to the right, as in FIG. 2A. The processing in the flowchart in FIG. 3B starts when the lighten composite processing mode is selected through the user setting on the operation unit 70 with the length of the star trail set to be relatively long (3 or 4). The operations in the steps in the processing are performed by the system control unit 50 or each unit under an instruction from the system control unit 50.

In step S301, an operation of capturing the first image or reading out the first image from the memory 32 is performed. The image serves as the first frame in the interval moving image, and the system control unit 50 outputs the image to a circuit for performing displaying or recording in a later step. Then, the brightness adjustment processing is performed on the first image. In the present exemplary embodiment, the gain down processing is performed with a gain corresponding to the setting on the length of the trail in step S302. The gain applied to the image data is set in such a manner that a gain down level is lower (closer to 1) in the setting 4, in which the trail set to be longer, than in the setting 3. The processing for adjusting the brightness of the image data is not limited to the gain down processing of the present exemplary embodiment in which the gain is applied to each pixel in the image data to lower the brightness, and may be any adjustment processing in which the brightness is adjusted with a digital signal such as γ processing.

In step S303, an operation of capturing the Nth image data (N≥2) or reading out the Nth image data from the memory 32 is performed. Unlike in the case of the first image data, this image data is not directly used as the image in the interval moving image. When the Nth image is captured, lighten compositing processing (first lighten compositing processing) is performed on the captured Nth image data and the (N−1)th composite image data that has been generated in step S308, in step S304. When N=2, the lighten compositing processing is performed on the second captured image data and the first gain down image generated in step S302. In this way, the stars captured in the Nth image are combined with the (N−1)th composite image obtained by the gain down processing in step S307 and second lighten compositing. The resultant data is defined as an Nth frame (image data) in the interval moving image. When the moving image data is displayed or recorded each time the image data is captured or read out, in step 305, the display unit 28 displays the Nth composite image on a display medium or the recording unit (system control unit 50) records the composite image in the recording medium 200.

In step S306, the system control unit 50 determines whether an instruction to terminate the image capturing or the image reading has been issued. When the system control unit 50 determines that the instruction has been issued (YES in step S306), the processing is terminated. When the system control unit 50 determines that the instruction has not been issued (NO in step S306), the processing proceeds to step S307. The instruction to terminate the image capturing or the image reading may be issued based on setting information defining the number of images to be captured and the imaging time in advance, or may be issued by an operation of the user. In step S307, the brightness adjustment (gain down) processing is further performed on the Nth composite image as displaying/recording target. Then, in step S308, the lighten composite processing is performed on the (N−1)th composite image obtained by the second lighten compositing and the Nth gain downed composite image in step S308 (second lighten compositing). Then, the processing returns to step S303 and the next (N+1)th image is captured or read out from the memory 32. In step S304, the lighten compositing processing is performed on the (N+1)th image and the Nth lighten composite image obtained by the second lighten compositing.

By repeating the processing in steps S303 to S308 described above, a star at a single position is gained down to be darkened while keeping the same brightness for two cycles, whereby a longer start trail can be achieved.

As described above, in the present exemplary embodiment, the moving image frames are generated by repeating the lighten composite processing and brightness adjustment processing. Thus, the moving image in which the trail of the subject is expressed with afterimages can be generated. In this way, an effect of obtaining an impressive movement of the subject, with the afterimage, can be generated while preventing the trail of the subject from leading to a visually undesirable image.

Furthermore, the afterimage can be expressed in various lengths by controlling the compositing processing in accordance with the length of the afterimage to be provided as the trail of the subject.

The composite method for expressing the trail of the subject with an afterimage is not limited to the lighten composite processing as in the present exemplary embodiment. The similar trail and the afterimage effect can be obtained by the darken composite processing when the subject is darker than the background. The afterimage effect can also be achieved by the weighting and the brightness adjustment on each image through the weighted addition composite processing. For example, the weighted addition composite processing may be performed instead of the lighten composite processing, through the addition performed with a larger weight given to a newer image for example, to achieve an afterimage effect. In the processing, the length of the afterimage can be adjusted by adjusting the gain in the brightness adjustment and changing combination of the combined images.

In the present exemplary embodiment, the method for achieving a longer apparent length of an falling star by simply keeping the brightness of the star to be the same between the first and the second captured images. The scope of the present invention includes a method of further combining the third captured image to achieve even longer apparent length.

Figure 4:
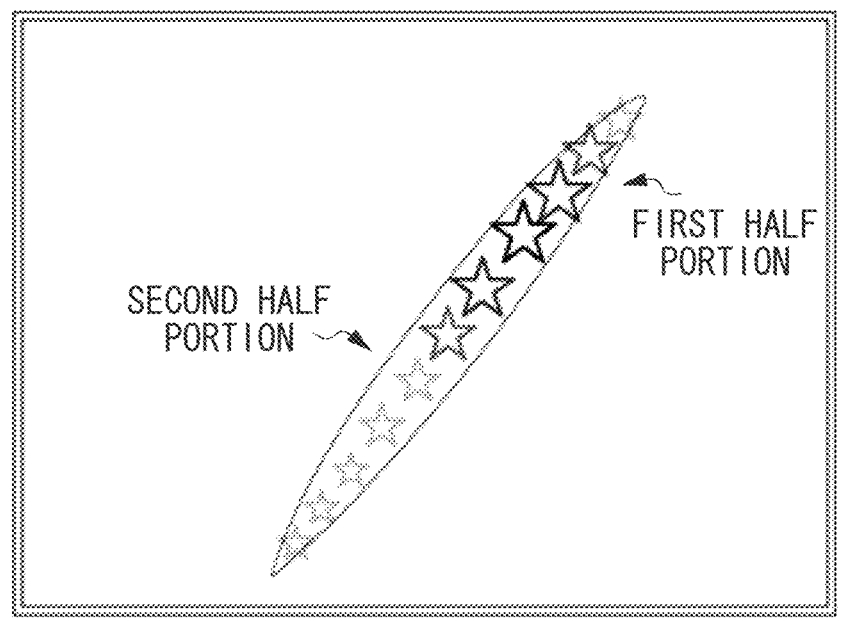
FIG. 4 is an image diagram of a star trail according to a second exemplary embodiment of the present invention.

An expression method in a second exemplary embodiment is different from the expression method for the trails of stars in the first exemplary embodiment in which the trails of stars are simply darkened gradually from the initial brightness. FIG. 4 is an image diagram illustrating a moving image frame obtained by a method for generating a composite moving image frame according to the present exemplary embodiment. FIG. 4 illustrates a trail of only one of stars moving from lower left to upper right at the time of imaging. As illustrated in FIG. 4, even when the actual brightness of the star is almost unchanged throughout the imaging, the star positioned at an upper right portion in the most recently captured frame is combined with the lowered brightness. The brightness is adjusted in such a manner that the brightness of the star reaches the peak in the frame captured few cycles before, and then drops again in the frames thereafter. With such an expression method, a natural star trail afterimage that looks like a falling star can be formed.

Figure 5:
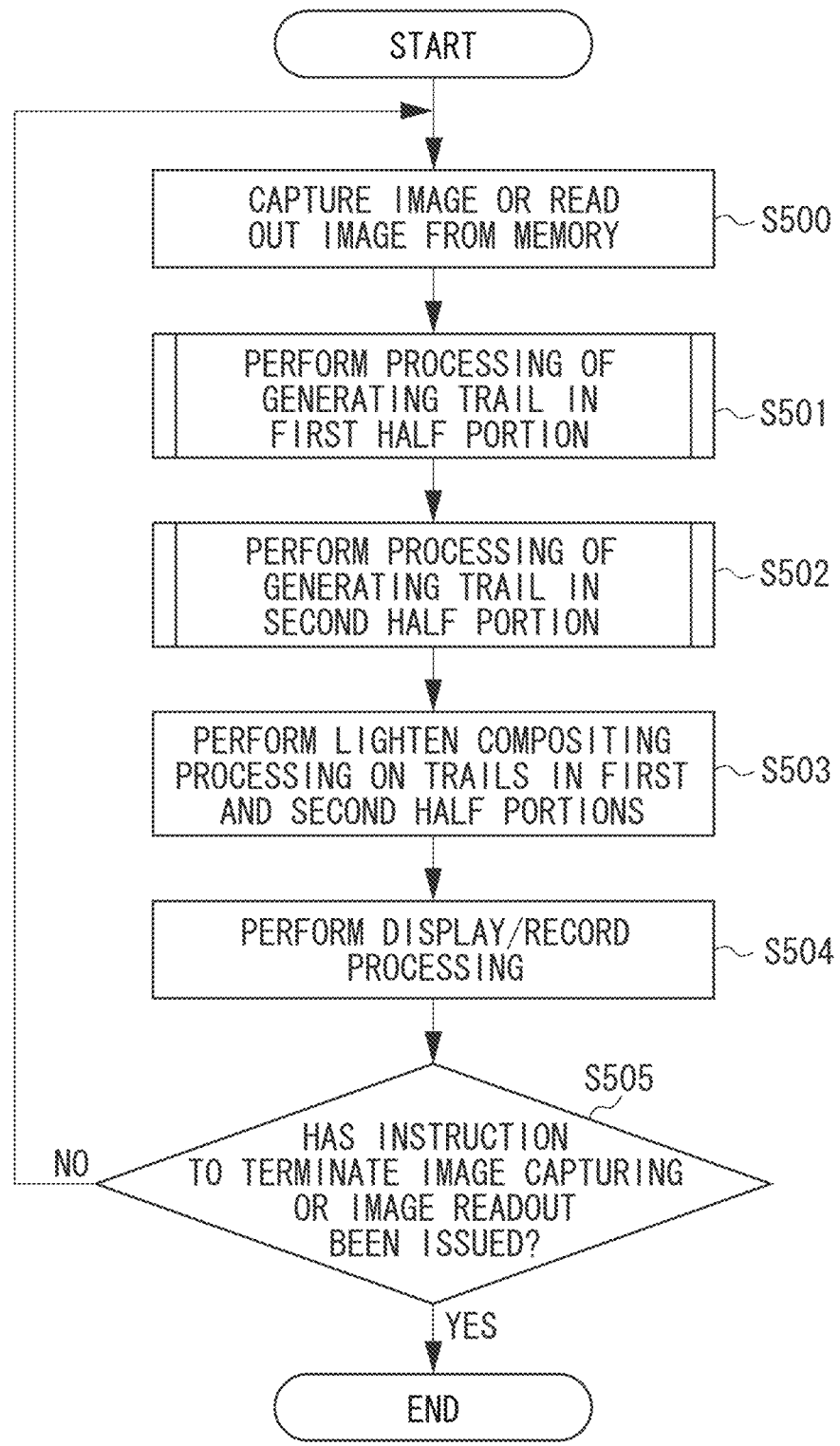
FIG. 5 is a flowchart illustrating a processing procedure for a trail afterimage mode according to the second exemplary embodiment of the present invention.
Figure 6A:
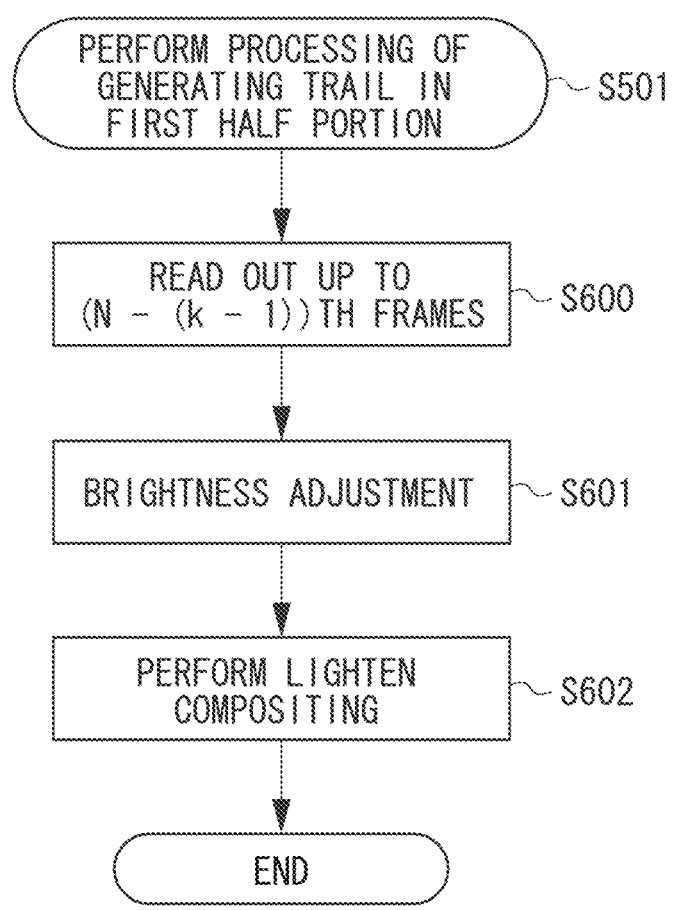
FIGS. 6A and 6B are flowcharts illustrating a procedure of processing for obtaining an afterimage effect according to the second exemplary embodiment.
Figure 6B:
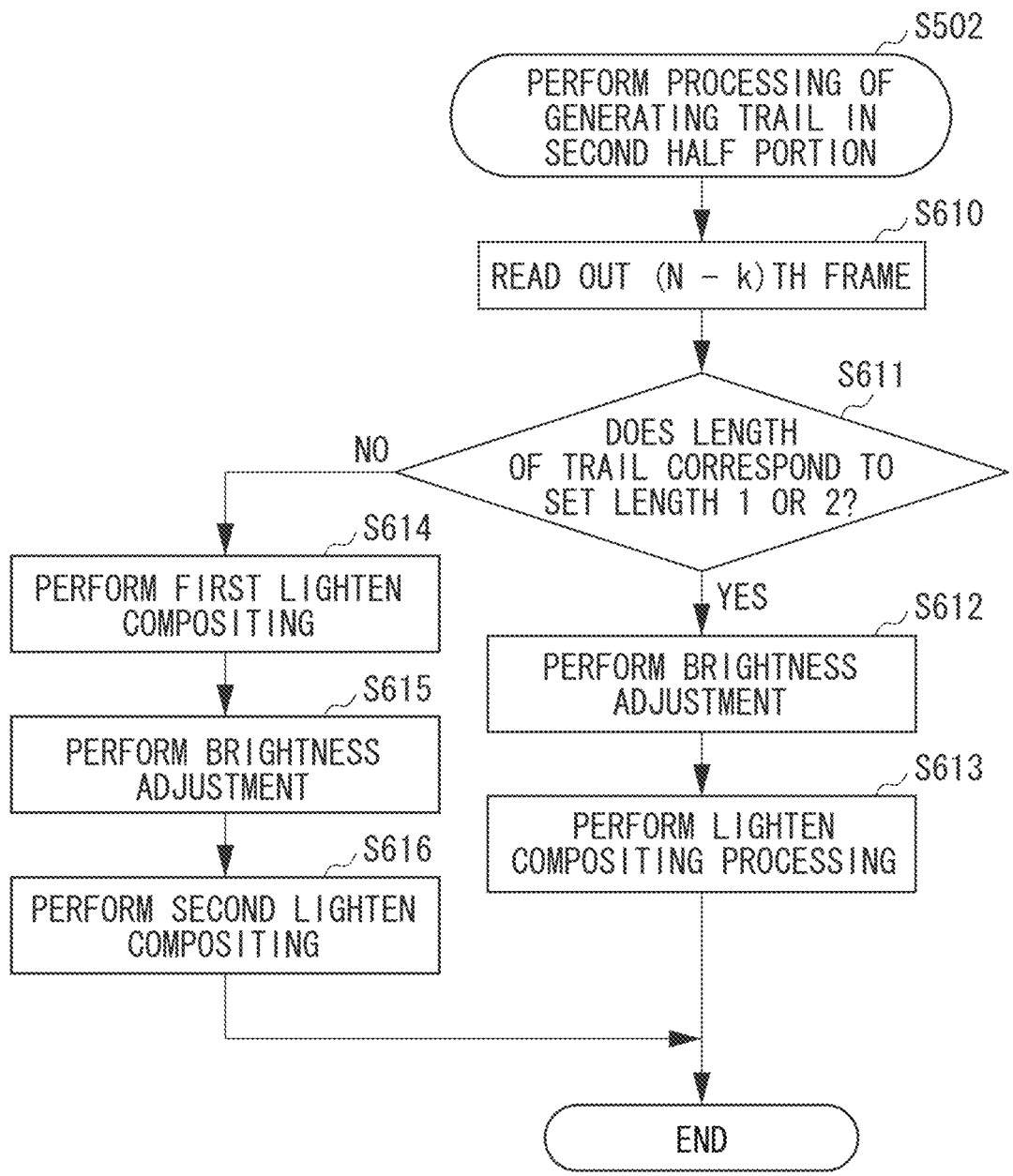

A method for generating a composite moving image frame in the present exemplary embodiment is described with reference to the flowcharts in FIGS. 5, 6A, and 6B. The trail (gradually darkening) in a second half portion illustrated in FIG. 4 is generated by the method described in the first exemplary embodiment, whereas the trail (gradually brightening) in a first half portion illustrated in FIG. 4 is generated by a method unique to the present exemplary embodiment. The present exemplary embodiment is described based on a procedure of sequentially processing sequentially acquired images by imaging. Still, the processing may also be performed by reading out image data for generating a moving image from the memory 32 at a timing other than the imaging. A series of operations are started by a user instruction after the lighten composite processing mode is selected through the user setting on the operation unit 70 (starry sky trail afterimage mode). The operations in the flowcharts are performed by the system control unit 50 or each unit under an instruction from the system control unit 50.

In step S500, the Nth captured frame (image) is captured or read out from the memory 32. In step S501, the processing of generating the trail in the first half portion as illustrated in FIG. 4 is performed with the system control unit 50, the image processing unit 24, the image combining unit 54, and the like. In step S502, the processing of generating the trail in the second half portion as illustrated in FIG. 4 is performed with the system control unit 50, the image processing unit 24, the image combining unit 54, and the like. In step S503, the pieces of composite image data with the trails in the first and the second half portions, obtained in steps S501 and 502, are combined by the lighten composite processing. When the moving image data is displayed or recorded each time the image data is captured or read out, in step 504, the display unit 28 displays the Nth composite image on a display medium or the recording unit (system control unit 50) records the composite image in the recording medium 200. It is a matter of course that the displaying and the recording may both be performed.

After the latest moving image frame is displayed or recorded, in step S505, the system control unit 50 determines whether the image capturing or the image reading has been completed. When the system control unit 50 determines that the image capturing or the image reading has not been completed (NO in step S505), the processing returns to step S500. When the system control unit 50 determines that the image capturing or the image reading has been completed (YES in step S205), then the processing is terminated.

Next, the processing of generating the trail in the first half portion illustrated in FIG. 4, performed in step S501 is described in detail with reference to the flowchart in FIG. 6A. In step S600, up to (N−(k−1))th frames are read out from the memory 32 storing, in advance, the latest frames including k frames (pieces of image data) required for generating the trail in the first half portion.

In step S601, brightness adjustment processing is performed on Nth, (N−1)th, . . . , (N−(k−1))th frames so that the brightness of the star is gradually increased in this order. The brightness adjustment processing is basically performed by gaining down rather than gaining up because the brightness adjustment processing by gaining up causes low signal to noise (SN) ratio and thus generating a noisy image. For example, when k=3, the brightness adjustment processing is performed in such a manner that the N, the N−1, and the N−2 frames have brightness of 30%, 60%, and 100%, respectively.

In step S602, the lighten composite processing is performed on k frames after the brightness adjustment processing. Thus, the resultant composite moving image includes k frames having a trail drawn with the brightness of the star gradually increasing from the latest frame to the kth frame.

The processing of generating the trail in the second half portion illustrated in FIG. 4, which is performed in step S502, is described in detail with reference to the flowchart in FIG. 6B. In step S610, the latest frame (N−k)th frame) for generating the trail in the second half portion is read out from the memory 32, when the Nth frame is captured or read out. In step S611, the length of the star trail is set to be one of four stages of 1 (short) to (long), in accordance with the user setting, the imaging condition, the imaging environment, and the like, as in the first exemplary embodiment. When the setting 1 or 2 is set (YES in step S611), the processing proceeds to step S612. In steps S612 and S613, the processing of generating the trail in the second half portion is performed with a method that is similar to that in FIG. 2B. When the setting 3 or 4 is set (NO in step S611), the processing proceeds to step S614. In steps S614 to S616, the processing of generating the trail in the second half portion is performed with a method that is similar to that in FIG. 3B. More specifically, in step S612, the adjustment processing is performed to darken the pieces of composite image data involving up to the previous frames. In step S613, the lighten compositing processing is performed on the resultant frame and the (N−k)th frame. In step S614, the lighten compositing is performed on the (N−k)th frame and the composite frame involving up to the previous frames (first lighten compositing). In steps S615 and S616, a frame obtained by gaining down the frame after the first lighten compositing and the frame obtained by lighten compositing (second lighten compositing) involving up to the previous frames are stored in the memory 32 to prepare for composite processing involving the next latest frame. The frame to be combined with the moving image frame including the trail in the first half in step S503 is the composite frame after the first lighten compositing.

Through the processing described above, the trail in the second half portion is generated in accordance with the setting as in the first exemplary embodiment.

The gain down amount to be set is described with reference to FIG. 7. FIG. 7 is a table illustrating a remaining brightness in each moving image frame, with the horizontal axis representing captured images and the vertical axis representing moving image frames. In the table, the number of frames k forming the trail in the first half portion is three. In the first frame, the captured image is set to have 30% as the remaining brightness (gained down by 70%) to be used for the lighten compositing. In the third frame, the third, the second, and the first captured images are set to have the remaining brightness of 30%, 60%, and 100%, respectively to be used for the lighten compositing. In other words, the image of the star, corresponding to the first half portion of the expressed trail, is generally maintained to have a predetermined gain down rate.

According to the method for generating the moving image frames through the image processing described above, the gain down processing is performed on the images from the first image in a case, for example, where the moving image is captured in a state where the sky is darkening from the sunset time and stars are gradually appearing. The resultant moving image might have the brightness low in the first moving image frame, increasing in next few frames, and then again lowering as the sky actually darkens, to give unnatural impression to the user viewing the moving image. Therefore, in the present exemplary embodiment, when the moving image capturing in the trail afterimage mode starts and the moving image frame is generated by the compositing, the first captured frame is not provided with the brightness adjustment for generating the trail in the first half portion in the present exemplary embodiment, and is combined with the second moving image frame and after. In this way, the lighten compositing is sequentially performed with the brightness of the background in the first imaging frame maintained. As a result, the first moving image frame and the composite moving image frame involving a predetermined number of frames under an influence of the first moving image frame can be prevented from having an unnaturally dark back ground.

FIG. 8 is a table illustrating a remaining brightness in each moving image frame with the horizontal axis representing captured images and the vertical axis representing moving image frames, as in FIG. 7. In the table, the number of frames k forming the trail in the first half portion is three. To address the problem described above, the first frame is set to have the first captured image set to have the brightness kept at 100% (no gain down) to be used for the lighten compositing. In this way, the brightness of the background does not drop, and therefore the entire image does not become dark. In the second frame, the brightness of the first captured image is maintained at 100% and the brightness of the second captured image is set to 30%. The bright portion still remains and thus the screen is prevented from being dark, even when the lighten compositing is performed on the images. By thus setting the gain down amount of the first captured image to be different from those of other captured images in the method described above, the moving image can be naturally depicted even when capturing an image where the sky is gradually darkening from the sunset time and the stars are gradually appearing.

As described above, in the present exemplary embodiment, the moving image frames are obtained by repeating the lighten composite processing and brightness adjustment processing. Thus, the moving image in which the trail of the subject is expressed with afterimages can be generated. Thus, an effect of obtaining an impressive movement of the subject, with the afterimage, can be obtained while preventing the trail of the subject from leading to a visually undesirable image.

Furthermore, the lighten compositing is preformed to provide a trail of a subject as an afterimage while being controlled in such a manner that the weights of the frames form a shape of an arch (rises and then drops after the peak). Thus, the expression with more natural star trail like a falling star remaining as the afterimage can be achieved. The trail image is generated without gaining up, and thus can be generated without being a noisy image due to the low SN rate.

Other Embodiments

The present invention is not limited to apparatuses such as digital cameras with image capturing as the main purpose, and can also be applied to any apparatus with an internally provided or externally connected image capturing device such as mobile phones, PCs (laptop, desk top, tablet PC, or the like), and game consoles. Thus, the term "image capture apparatus" in the specification is intended to include any apparatus with an image capture function.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An imaging apparatus comprising:
    an image sensor configured to output image data;
    at least one processor configured to function as:
        an acquisition unit configured to sequentially acquire pieces of starry-sky image data;
        a generation unit configured to perform lighten composite processing on a plurality of pieces of starry-sky image data sequentially acquired by the acquisition unit and generate a star-trail moving image with composite image data obtained as a result of the lighten composite processing; and
        a setting unit configured to make a setting for controlling whether to fade out a part of a star trail included in the star-trail moving image generated by the generation unit,
    wherein fading out the part of the star trail is processing of gradually darkening the part of the star trail along with the progress of the star-trail moving image, and
    wherein the generation unit generates the star-trail moving image based on the setting made by the setting unit.

2. The imaging apparatus according to claim 1, wherein the setting made by the setting unit includes a setting for controlling a degree of fading out the part of the star trail along with the progress of the star-trail moving image.

3. The imaging apparatus according to claim 2, wherein the star trail included in the star-trail moving image is longer in a case where the degree set by the setting unit is a first degree than in a case where the degree set by the setting unit is a second degree.

4. The imaging apparatus according to claim 2, wherein the degree of fading out the part of the star trail is controllable to at least three stages.

5. The imaging apparatus according to claim 2, wherein the degree of fading out the part of the star trail is controllable in a case where the imaging apparatus is operated in a predetermined mode for generating the star-trail moving image.

6. The imaging apparatus according to claim 2, wherein the degree of fading out the part of the star trail is set based on a user operation.

7. The imaging apparatus according to claim 1, wherein the acquisition unit acquires a plurality of pieces of starry-sky image data by performing interval imaging using the image sensor.

8. A method for controlling an imaging apparatus, the control method comprising:
    sequentially acquire pieces of starry-sky image data;
    performing lighten composite processing on a plurality of the sequentially acquired pieces of starry-sky image data and generating a star-trail moving image with composite image data obtained as a result of the lighten composite processing; and
    making a setting for controlling whether to fade out a part of a star trail included in the generated star-trail moving image,
    wherein fading out the part of the star trail is processing of gradually darkening the part of the star trail along with the progress of the star-trail moving image, and
    wherein the generating step generates the star-trail moving image based on the made setting.

9. A non-transitory computer-readable storage medium storing a program for causing a computer to execute a method for controlling an imaging apparatus, the method comprising:
    sequentially acquire pieces of starry-sky image data;
    performing lighten composite processing on a plurality of the sequentially acquired pieces of starry-sky image data and generating a star-trail moving image with composite image data obtained as a result of the lighten composite processing; and making a setting for controlling whether to fade out a part of a star trail included in the generated star-trail moving image, wherein fading out the part of the star trail is processing of gradually darkening the part of the star trail along with the progress of the star-trail moving image, and wherein the generating step generates the star-trail moving image based on the made setting.

10. The imaging apparatus according to claim 1, wherein the star-trail moving image is moving image data including a plurality of frames.

\* \* \* \* \*